R. H. GREGORY.
COMBINED JACK AND WRENCH.
APPLICATION FILED JAN. 11, 1913.
1,078,850.
Patented Nov. 18, 1913.
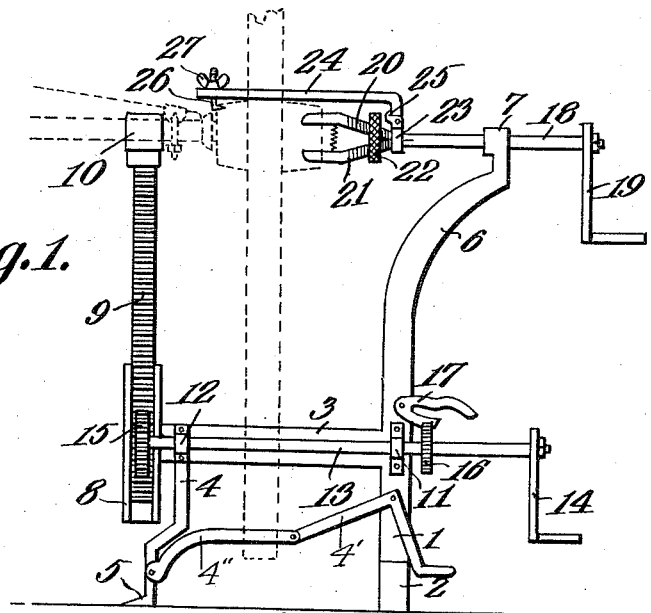
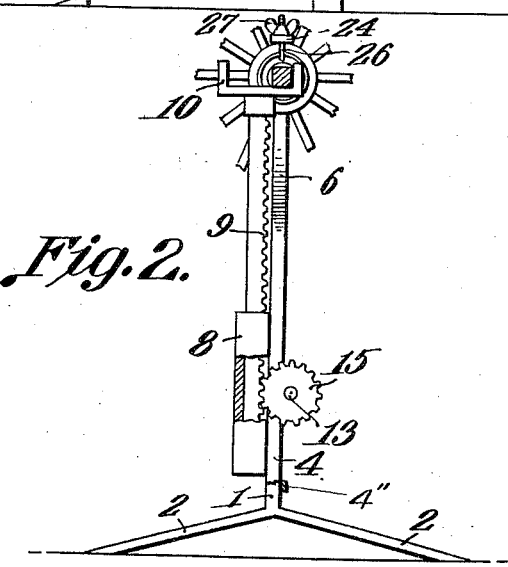
Witnesses
Robert H. Gregory,
Inventor
by C.A. Snow & Co.
Attorneys

UNITED STATES PATENT OFFICE.

ROBERT HENRY GREGORY, OF CLEBURNE, TEXAS.

COMBINED JACK AND WRENCH.

1,078,850. Specification of Letters Patent. Patented Nov. 18, 1913.

Application filed January 11, 1913. Serial No. 741,600.

*To all whom it may concern:*

Be it known that I, ROBERT H. GREGORY, a citizen of the United States, residing at Cleburne, in the county of Johnson and State of Texas, have invented a new and useful Combined Jack and Wrench, of which the following is a specification.

This invention relates to a combined wagon jack and wrench.

An object is to provide a lifting jack whereby the axle and wheels thereon may be lifted.

A further object is to provide means whereby the axle nut may be removed and the wheel withdrawn from the spindle.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a view in elevation of my improved jack and wrench, the same being illustrated as in operative position with respect to a carriage wheel and axle, the latter being illustrated in dotted lines. Fig. 2 is an end elevation of the same.

Referring to the drawings in which similar reference numerals designate corresponding parts throughout the several views, the supporting frame is composed of the vertical member 1 which is provided with the outstanding feet 2 and a cross bar 3 to which is pivotally secured the leg 4, the leg 4 being provided with the downwardly and outwardly extending foot 5. The cross bar 3 is held to the member 1 by welding or other suitable means and the frame so composed is a substantial one, and due to the three supporting feet is adapted to remain in an upright position and rest securely on uneven ground. The pivoted leg 4 is so arranged that it can be folded upward against the cross bar 3 in which position it is placed when putting my combined jack and wrench into practical use by extending the cross bar and pivoted leg through the spokes of the wagon wheel.

Pivotally connected to the leg 4 is a suitable link 4″ which is pivotally connected to the handle 4′. Thus by means of the handle 4′ and the links 4″ the pivoted leg 4 may be inserted through the spokes of the wagon wheel in a folded position and by suitable actuation of the handle 4′ may be made to assume a vertical and therefore a supporting position, as indicated in Fig. 1.

To the outer extremity of the cross bar 3 is secured a vertical guide bar 8, the guide bar being substantially U-shape in cross section and is adapted to receive therein a rack rod 9, the edges of the U-shaped guide bar forming retaining walls between which the rack rod is adapted to move. The upper end of the rack rod is enlarged and provided with a forked head 10 which is adapted to contact with and support the axle of the wagon a wheel of which is to be raised and removed.

Mounted upon the frame member 1 and securely held thereto is a bearing block 11, 12 being a similar bearing block in alinement therewith and positioned upon the outer portion of the cross bar 3, the said bearing blocks receiving therein a pinion carrying shaft 13 which is provided with the crank actuating handle 14 secured to the outer end thereof. A pinion 15 is rigidly secured to the remote end of said shaft and coacts with the rack rod 9 to raise and lower the latter which will raise and lower the axle of the carriage. Suitable collars are illustrated upon the shaft 13 and are adapted to retain the pinion in active relation with respect to the rack rod 9. In order that the carriage may be kept in a raised position, a suitable ratchet wheel 16 is mounted securely upon the jack and a pawl 17 is pivotally supported thereabove and adapted to coact therewith.

The portions herein described constitute the jack portion of my improved combined jack and carriage wrench.

The upper portion of the frame member 1 is bent outwardly as at 6 and provided with a journaled head 7 in which is slidably and rotatably mounted the wrench shaft 18 to the outer end of which is secured the actuating crank handle 19. The inner end of the shaft 18 has been illustrated as being bifurcated and forming thereby the nut clamping jaws 20 and 21. These jaws are provided with the usual chuck wheel 22 which is adapted to open or close the jaws according to the size of the axle nut to be engaged. I wish it to be understood in this connection that a nut engaging socket may be used in place of the nut engaging jaws without departing from the spirit of my invention.

Slidably mounted upon the shaft 18 is a collar 23 to which is pivotally secured an L-shaped rod 24, the collar 23 being provided with an outstanding shoulder 25 which limits the downward movement of the rod 24 to the position as illustrated in Fig. 1 which is substantially horizontal. A latch member 26 is mounted within an opening in the outer end of the rod 24 and is supported thereon and adjusted with relation thereto by means of a suitable wing nut or thumb screw 27, the object of the rod 24 with the depending latch and thumb screw being to engage the hub of the wheel and hold the latter in a suspended position after the same has been removed from the axle spindle, it being understood in this connection that at the same time the handle 19 is turned to remove the nut it is also drawn outwardly which will remove the wagon wheel from off of the spindle and it will be maintained in a suspended position by means of the rod 24 with the depending latch secured thereto. This is an important advantage for it allows the wheel to be removed or replaced without necessitating the actual handling thereof.

From the foregoing it will be apparent that I have provided for an improved jack and carriage wrench, one leg of which may be folded during the positioning thereof between the carriage wheel spokes. By reason of the tension spring secured thereto, the leg will immediately assume a vertical position upon being released, and the frame or stand having three points of support will be very stable in use. The rack rod slidably mounted within the retaining guides and the actuating pinion mounted upon the shaft 13 form a convenient and efficient jack for the raising of a wagon axle. The axle nut wrench with the wheel suspending rod slidably mounted thereon are efficient in operation and form a novel carriage nut wrench.

Having thus fully described the construction and operation and pointed out the particular advantages of my improved carriage jack and wrench, what I claim to be new and original with me is:—

1. In a wheel removing device the combination of a frame, means mounted thereon for raising a carriage wheel axle, a shaft journaled to the upper extremity of the frame, means secured to the shaft whereby the same may be manually rotated, nut engaging means mounted at the remote end of said shaft adapted to engage the nut of a carriage wheel axle for the removal thereof, a horizontal rod pivotally and slidably supported at the upper extremity of the frame and adapted to extend through the spokes of a carriage wheel, and a clamp secured to the remote end of said horizontal rod adapted to engage a wagon wheel hub, to hold the same in a suspended condition.

2. In a wheel removing device, the combination of a frame, means mounted thereon for raising a carriage wheel axle, a shaft journaled to the upper extremity of said frame, a crank handle mounted at one end of said shaft, a nut engaging means mounted at the other end thereof, a collar slidably mounted upon said shaft, a horizontal rod pivotally secured to said collar, said rod provided with an aperture at the outer end thereof, a latch extending through said aperture and adapted to engage a wagon wheel hub.

3. In a device of the class described, a frame comprising a vertical member with outstanding feet, a cross bar extending therefrom, a leg pivotally secured to the outer end of said cross bar and forming the third support for said frame, means for maintaining said pivoted leg in a raised position, said cross bar adapted to be inserted through the spokes of a wheel with the said pivoted leg in a raised position, means for lowering the said leg, a shaft mounted at the upper end of said vertical member, a crank handle carried by said shaft, a collar rotatably and slidably mounted upon said shaft, an L-shaped rod pivoted to said collar, said rod adapted to extend through the wheel spokes and to engage the inner portion of the wheel hub, to thereby maintain the wheel in a suspended position when removed from its axle spindle.

In testimony that I claim the foregoing as my own, I have hereto affixed my signature in the presence of two witnesses.

ROBERT HENRY GREGORY.

Witnesses:
 A. S. BLUDSOE,
 R. L. PHILLIPS.

---

Copies of this patent may be obtained for five cents each, by addressing the "Commissioner of Patents, Washington, D. C."